Aug. 18, 1959     B. KAZAN     2,900,574
ELECTROLUMINESCENT DEVICE
Filed April 5, 1956     2 Sheets-Sheet 1

INVENTOR.
BENJAMIN KAZAN
BY
William A. Zaluak
ATTORNEY

Aug. 18, 1959  B. KAZAN  2,900,574
ELECTROLUMINESCENT DEVICE
Filed April 5, 1956  2 Sheets-Sheet 2

INVENTOR.
BENJAMIN KAZAN
BY
William A. Balerak
ATTORNEY

United States Patent Office 2,900,574
Patented Aug. 18, 1959

2,900,574

ELECTROLUMINESCENT DEVICE

Benjamin Kazan, Princeton, N.J., assignor to Radio Corporation of America, a corporation of Delaware Application April 5, 1956, Serial No. 576,261

10 Claims. (Cl. 315—169)

This invention relates to electroluminescent devices. In particular, this invention relates to electroluminescent devices that produce a moving spot of light.

It is known that many phosphor materials may be caused to emit visible radiations by subjecting them to electric fields of sufficient magnitude. This phenomenon has been termed electroluminescence, and may be effected by applying a voltage across the selected phosphor. If a direct current voltage is applied across the phosphor, the voltage will induce a burst of electroluminescence in the phosphor as an electric field builds up thereacross. The electroluminescence will cease when the full charge has been received and the electric field stabilized. The subsequent removal of the direct voltage, and the discharge of the accumulated charge, will produce a second burst of electroluminescence as the electric field collapses.

Thus, if an alternating current voltage of sufficient magnitude is applied across the phosphor, bursts of electroluminescence will occur for each charge and discharge induced by the alternating current voltage. For this reason, alternating current voltage has been used in the art to produce seemingly constant electroluminescence since, if the frequency of the applied alternating current voltage is high enough, the bursts of electroluminescence will occur at intervals shorter than the retentivity of the human eye, thus making the electroluminescence appear to be continuous.

Electroluminescence may also be produced by providing each particle of the electroluminescent phosphor with a suitable series resistance to permit a certain current flow when a direct current voltage of sufficient value is applied. Such electroluminescence appears to be continuous and its intensity may be controlled by varying the amount of current flow through the phosphor particles.

Several theories explaining the above described phenomenon have been advanced, none of which are entirely satisfactory. However, it seems to be agreed that the electroluminescence results from a redistribution of electrons in the crystal structure of the electroluminescent material and the consequent emission of light from such material.

In the prior art electroluminescent light amplifying devices, the light is produced only at particular points that are excited by the input signal substantially at the time these points are excited.

The principal object of the invention is to provide an electroluminescent device which when triggered on will produce a spot of light that automatically moves along a predetermined path in the device.

This type of traveling light spot device is desirable for purposes such as successively switching on a row of photoconductive elements in a particular time sequence; for causing a light spot to automatically move along a path for indicating purposes; or for scanning an area with a light spot having a limited speed.

It is another object of this invention to provide an improved array of electroluminescent elements.

It is a further object of this invention to provide a novel display and/or storage means for images.

These and other objects are accomplished in accordance with this invention by providing a row of elemental units each including a photoconductor and an electroluminescent element that are coupled together by light from the electroluminescent element. The elemental units are so arranged that a decrease in resistance in a photoconductor in one unit applies a voltage to the electroluminescent element in an adjacent unit. A spot of light is thus produced which moves along the row from unit to unit automatically. In embodiments of this invention the traveling spot of light may be stopped at any desired time so that the information may be viewed or stored indefinitely. A plurality of such rows is desirable for displaying images on a large screen without projecting these images; and also for storing these images between successive scans. Furthermore, when using a plurality of such rows there is no need for selecting the particular point that is to emit light.

The invention will be more clearly understood from the following detailed description when read in connection with the accompanying two sheets of drawings, wherein.

Figure 1:
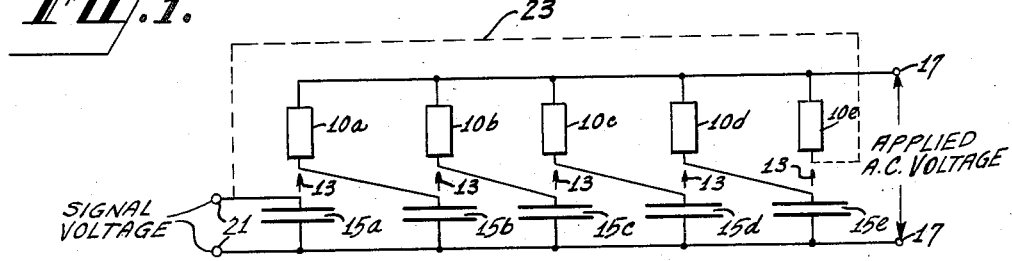
Figure 1 is a schematic representation of a traveling spot device in accordance with this invention.

Referring now to Figure 1, there is shown a schematic view of a traveling spot device in accordance with this invention. The device comprises a row of photoconductive elements or cells 10a to 10d which are electrically in series with a row of electroluminescent elements or cells 15b to 15e. As shown in the drawing, an elemental unit of the device comprises a photoconductor, e.g. photoconductor 10a, and an electroluminescent element, e.g. electroluminescent element 15a that are in light feedback relationship. The adjacent rows of photoconductors and electroluminescent elements form a row of elemental units. The electroluminescent element 15c, for example, is in light exchange relationship, as represented by arrows 13, primarily with the photoconductor 10c, while photoconductor 10c is electrically connected to an electroluminescent element 15d in an adjacent elemental unit. Furthermore, a photoconductor in one elemental unit is so arranged that it receives very little light from the electroluminescent element in other units. As an example, light from electroluminescent element 15c strikes substantially only the photoconductor 10c. The series circuit of an electroluminescent element in one unit and a photoconductor in an adjacent unit is connected across a source of potential from terminals 17, designated as the applied A.C. voltage source. The A.C. voltage source is of sufficient magnitude to produce luminescence of the electroluminescent elements when the impedance of the photoconductor is decreased below a predetermined value. As is known, the impedance of the photoconductors may be decreased by directing light onto the photoconductor. One means of directing light onto the photoconductor 10a is to apply a momentary signal or trigger voltage to terminals 21, i.e. across electroluminescent element 15a. When the trigger voltage is of sufficient magnitude to cause the electroluminescent element 15a to be luminescent, the light from the electroluminescent element 15a strikes the photoconductor in that unit, i.e. photoconductor 10a, which decreases the resistance thereof. Since the impedance of the photoconductor 10a is decreased, the voltage from terminals 17 is applied across electroluminescent element 15b in an adjacent unit so that the electroluminescent element 15b produces light. Then, the light from electroluminescent element 15b strikes photoconductor 10b and thereby decreases the impedance thereof. By this action a spot of light, initiated by the signal voltage, moves along the electroluminescent elements in the linear array shown in Figure 1.

When the signal or trigger voltage is removed from terminals 21, the electroluminescent element 15a will no longer produce light. Since, at this time, no light is striking the photoconductor 10a, the photoconductor 10a will return to its original high impedance state which will cut off the luminescence of the electroluminescent element 15b. By this action, the light traveling down the row shown in Figure 1 is merely a spot of light rather than a continuous line of light. Thus, the light output of an electroluminscent element of one unit serves to form the voltage input for the next unit in the row. As shown by dotted line 23, the last photoconductive element 10e may be electrically coupled back to the first electroluminescent element 15a so that the light spot will move through the row, and then start through again. It should be understood that the last photoconductor 10e may be coupled to other means. For example, in a panel of a plurality of rows, each similar to the one shown in Figure 1, it would be desirable to connect the last photoconductor in the first row to the first electroluminescent element in the second row. It should also be understood that an array may include any number of units, and five are shown merely for simplicity of illustration.

The time of scanning through a device in accordance with this invention is determined by the materials selected for the photoconductive elements and the electroluminescent elements, as well as the frequency and voltage applied. Under certain conditions over 500 elemental units may be energized per second.

The photoconductors 10a through 10e may be materials in powdered form, sintered materials, evaporated materials, or single crystals of material. Some photoconductive materials are cadmium sulphide, and cadmium selenide. Electroluminescent phosphors 15a through 15e may be formed of any known electroluminescent phosphor such as copper-activated zinc sulphide, a mixture of zinc sulphide and zinc selenide that is activated with copper and ammonium bromate, or a mixture of zinc selenide and cadmium selenide that is activated with copper and ammonium bromate. The electroluminescent phosphor preferably emits a color of light which is within the range of response of the photoconductors used.

Figure 2:
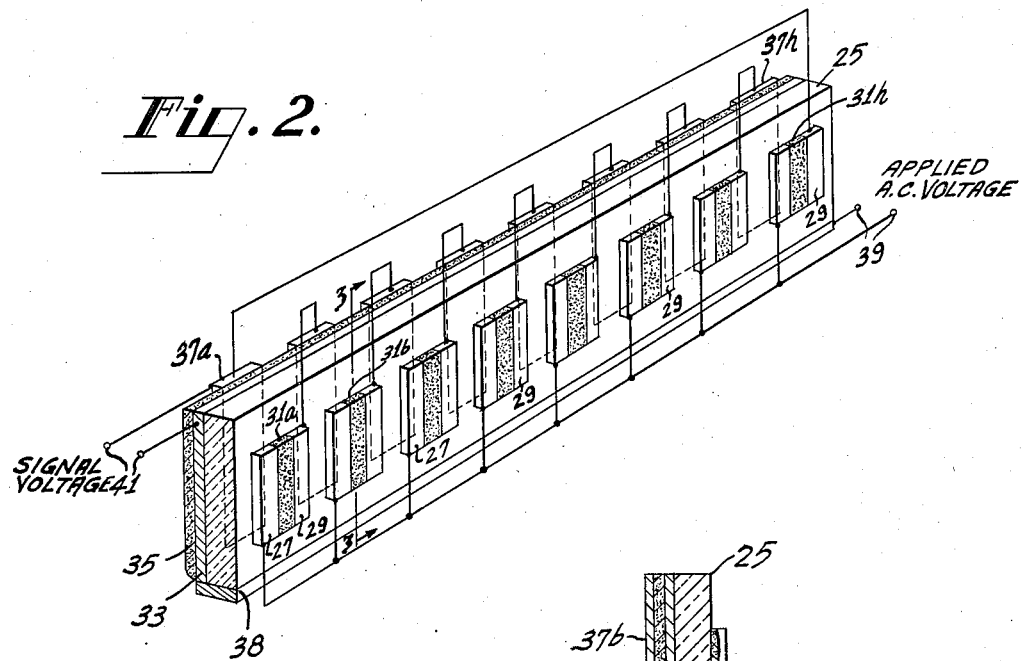
Figure 2 is a fragmentary perspective view of the traveling spot device of Fig. 1.
Figure 3:
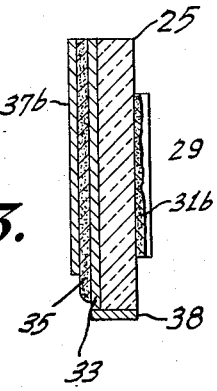
Figure 3 is a transverse sectional view taken along line 3—3 of Figure 2.

Referring now to Figures 2 and 3, there is shown a perspective view, and a sectional view respectively of a structure of the device schematically shown in Figure 1. The elements in Figure 2 are supported upon a glass sheet 25. On one side of the glass sheet 25 is a plurality of electrodes 27 each of which is spaced from a corresponding electrode 29. The electrodes 27 and 29 may be transparent and may be of a material such as aluminum. The electrodes 27 and 29 may be evaporated onto the glass support plate 25. Filling the separate gaps, each of which may be approximately 20 mils, between each pair of electrodes 27 and 29 is a photoconductive material 31a to 31h, thereby forming a row of photoconductive cells. Arranged on the opposite surface of the transparent support sheet 25 is a transparent coating 33. The transparent conductive coating 33 may be made of a material such as tin chloride or tin oxide. On the transparent conductive coating 33 there is arranged a sheet of electroluminescent phosphor material 35. On the electroluminescent phosphor material 35 there is arranged a plurality of conductive members 37a to 37h, thereby forming a row of electroluminescent cells. The conductive members 37a to 37h may be made of a material such as evaporated aluminum and are preferably of such a thickness as to be partially transparent. Each of the conductive members 37a to 37h is arranged opposite a corresponding photoconductor 31a to 31h. Thus, the light from the electroluminescent material 35, under particular conductors 37a to 37h, is fed back to decrease the resistance of a respective photoconductor 31a to 31h. On the bottom of sheet 25 there is arranged a continuous coating 38 of conducting material, e.g. silver, which makes good electrical contact with the transparent conductive coating 33.

During operation, an input voltage is applied to terminals 39. One of the terminals 39 is connected to each of the electrodes 27, while the other terminal 39 is connected to the transparent conductive coating 33. Thus, the potential difference of terminals 39 is across a plurality of series circuits each including a separated area of the electroluminescent material and one of the photoconductors 31a to 31h. When one of the photoconductors, e.g. photoconductor 31a, is made conductive, this voltage is applied between conductive member 37a and the transparent conductive coating 33. This applies the voltage directly across the electroluminescent layer 35 which produces light. The light from the electroluminescent layer 35 feeds back to the photoconductor 31b in that unit which causes the resistance of the photoconductor 31b to decrease. As an example, when an input signal or trigger voltage is applied to terminals 41, the electroluminescent phosphor under the conductor 37a produces light. This light decreases the resistance of photoconductor 31a which results in the application of the input voltage across the electroluminescent phosphor under the conducting member 37b etc., as described above.

Thus, an input voltage pulse applied to terminals 41 produces a spot of light moving along the array. Because of the response time of the photoconductors, and the build up time of the electroluminescent element, a time delay exists between the lighting up of successive electroluminescent elements, thus causing a movement of the emitted light. A train of input voltage pulses likewise produces a train of light spots moving along the array.

As an example of operation, the voltage source connected to terminals 39 may be a source of 500 to 1000 volts, 10,000 cycles, alternating current, and the input signal voltage applied to terminals 41 may be an electrical pulse, an amplitude modulated alternating current signal, or a varying direct current of approximately 50 to 200 volts.

Figure 4:
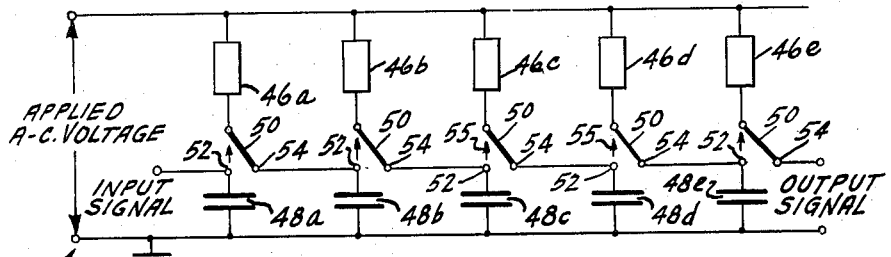
Figure 4 is a schematic representation of a storage device in accordance with this invention.

Referring now to Figure 4, there is shown a schematic representation of a circuit illustrating another embodiment of the invention. In this figure a plurality of photoconductors 46a to 46d are each electrically connected to an electroluminescent element 48b to 48e in an adjacent unit by means of a plurality of switches 50. In the switch position shown, i.e. switches 50 on the switch position 54, the circuit shown in Figure 4 is similar to the circuit shown in Figure 1 and further description thereof is not deemed necessary. However, if during the operation of the circuit shown in Figure 4, i.e. when the light spots are moving down the row, all of the switches 50 are switched to terminals 52, the particular information on the row at that instant will be stored in the row. As an example, assuming that electroluminescent element 48c is producing light when the switches 50 are switched to terminals 52, the feedback light 55 from element 48c will strike photoconductor 46c and maintain its low resistance. Since the photoconductor 46c, which now is of a low resistance, is in the series circuit with the electroluminescent element 48c, i.e. in series within its own unit, the electroluminescent element 48c will continue to produce light.

Once the stored information has been viewed for the desired length of time, the switches 50 are returned to terminals 54 and the stored information will continue to propagate down the row. Thus, the information passes through the row during a predetermined time. This information may be stored at any desired time, and the stored information may be erased at any desired time.

Figure 5:
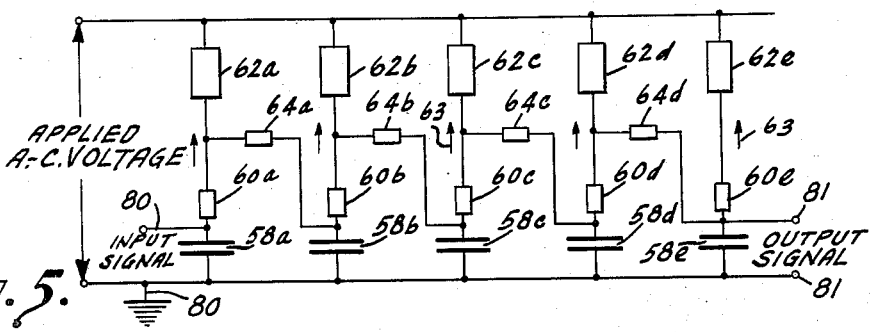
Figure 5 is a schematic view of another storage device in accordance with this invention; and, Figures 6 and 7 are perspective views of the storage device shown in Figure 5.

Referring now to Figure 5, there is shown a schematic representation of a modification of Fig. 4. In this figure a plurality of electroluminescent elements 58a to 58e are each connected in series with a different one of a plurality of photoconductive elements 60a to 60e and 62a to 62e. Connected between photoconductive elements 60 and 62 in each elemental unit and to the electroluminescent element 58 in an adjacent unit, is a photoconductive element 64. Each photoconductive element 62 is in light exchange relationship with its respective electroluminescent element 58 as represented by arrows 63. Photoconductive elements 60a to 60e and photoconductive elements 64a to 64d, which are hereinafter referred to as switching photoconductive elements, are shielded from the light from the electroluminescent elements.

During operation, when it is desired to propagate a spot of light down the array, the resistance of switching photoconductive elements 64a to 64d is decreased. This is the equivalent of placing switches 50 onto terminals 54 as described in connection with Figure 4. The resistance of all of the switching photoconductive elements 64a to 64d may be decreased by directing a light from a source (not shown) onto the switching photoconductors 64. When it is desired to store information on a particular area of the array, the switching photoconductors 60a to 60e are made conductive, and the switching photoconductors 64 are made insulating. This is the equivalent of placing switches 50 on terminal 52 of Figure 4. The energizing of switching photoconductors 60a to 60e may also be done by another source of light (not shown).

Figures 6, 7:
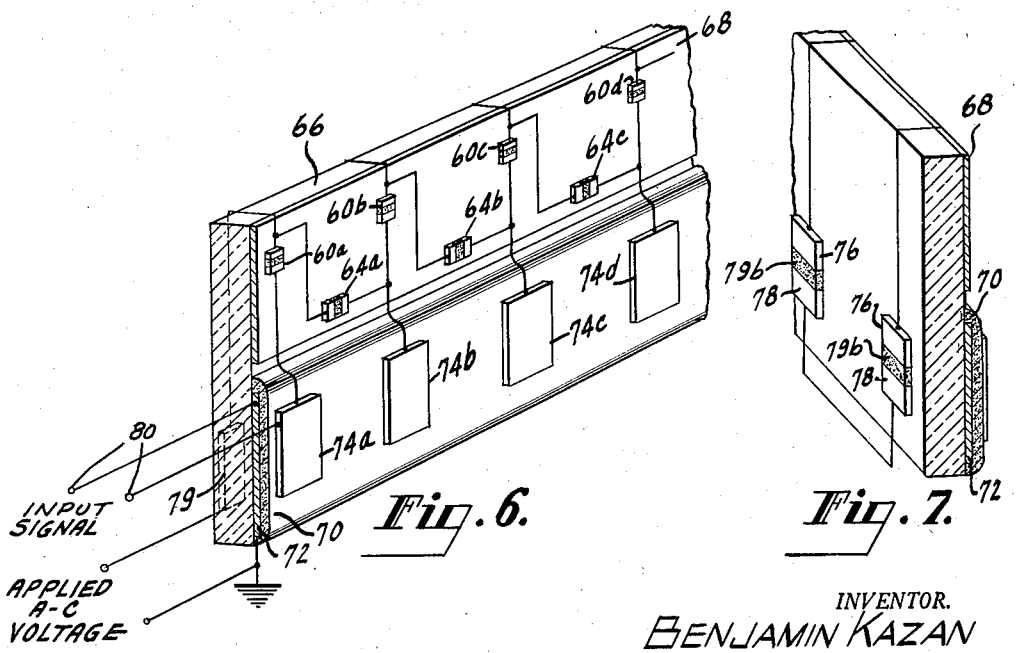

Referring now to Figures 6 and 7 there is shown two fragmentary perspective views of a storage and display apparatus in accordance with this invention. The elements in the display apparatus are supported on a glass sheet 66 which is coated with an opaque layer 68 such as black lacquer on one surface. Arranged on the opaque layer are the switching photoconductive elements 60a to 60e and 64a to 64e similar to those previously described. Supported on the support sheet 66 is a layer of transparent conductive material 72 which in turn is covered by a layer of electroluminescent phosphor 70. Arranged on the surface of the phosphor 70 is a plurality of conducting electrodes 74a to 74e. On the opposite surface of the support glass 66 there is provided a plurality of pairs of electrodes 76 and 78. Between the electrodes of each pair is a photoconductive material 79a to 79e. The photoconductive material 79a to 79e is the equivalent of photoconductors 62a to 62e shown in Figure 5 and is in light exchange relationship with the areas of the electroluminescent phosphor 70 under respective ones of the conducting electrodes 74a to 74e. The materials utilized for the panel shown in Figures 6 and 7 may be similar to those previously described.

During operation of the device shown in Figures 5, 6 and 7, input pulses of voltage, or other types of signals may be propagated down the row by decreasing the resistance of switching photoconductors 64a to 64e, and may be stored by decreasing the resistance of switching photoconductors 60a to 60e. Therefore, a plurality of rows may be utilized to reproduce a complete picture of information. This may be done due to the fact that when input signals are applied to terminals 80, connected to opposite sides of the first electroluminescent element 58a, the signals energize individual areas of the electroluminescent panel depending upon the magnitude and the time sequence of the signals. When it is desired to store a complete image, the input information is fed into a panel of such rows until the desired picture is obtained. At this time all of the switching photoconductors 60 are energized by light and the information is stored.

In using a panel comprising a plurality of rows such as that shown in Figure 6, the rows may be arranged in radial lines for radar purposes, or horizontal lines for television purposes. When the video signal input is for some type of high speed frame scanning, the input signal be be put into a storage device of the frequency converter type (not shown) and then read out at the propagation frequency of the panel. It should be understood that the device may also be utilized as an arbitrary delay line for information. Thus, information may be applied to input terminals 80 and stored, or delayed, for any desired length of time and then read out at output terminals 81, connected to opposite sides of the last electroluminescent element 58e as electrical information. The stored information may be viewed from either side of the panel. The definition of the viewed picture is determined by the size and number of electroluminescent elements in the device.

During operation of a plurality of rows, information may be fed into the rows sequentially, i.e. one row after another, or simultaneously to all of the rows.

During operation of any of the embodiments shown in Figures 1 through 7, an increase in the magnitude of the applied A.C. voltage will generally cause an increase in the velocity of propagation down the row, as well as increasing the brightness of the spots. Likewise, a change in frequency of the applied A.C. voltage will vary the rate of propagation down the row.

For single spot transmission type of operation, it is possible to help prevent the spreading of light spots by placing a current limiting resistor in the voltage supply line which limits the current available to the device.

It should be understood the devices in accordance with this invention can also be modulated by a light on the first electroluminescent element and the output may be obtained by a light sensitive means, e.g. a photocell, coupled to the electroluminescent elements in the device.

What is claimed is:

1. An electroluminescent device comprising a row of spaced electroluminescent cells each exposed to view, a row of photoconductive cells each electrically insulated from but arranged to receive light from a different one of said electroluminescent cells and forming therewith an elemental unit, first means connecting each photoconductive cell except the last one in the row in series with the electroluminescent cell of the next unit in said row, second means connecting all of said units in parallel with each other for applying a voltage thereacross, whereby excitation of the first photoconductive cell results in automatic excitation of said electroluminescent and photoconductive cells in succession.

2. An electroluminescent device as in claim 1, further including means for applying an electric field across the first electroluminescent cell of said row for exciting said first photoconductive cell.

3. An electroluminescent device as in claim 1, wherein said first means comprises an electrical connection between one side of each photoconductive cell except the last and one side of the electroluminescent cell of the next unit, and said second means comprises means electrically connecting the other sides of said photoconductive cells together and means electrically connecting the other sides of said electroluminescent cells together.

4. An electroluminescent device comprising a transparent insulating support member having extended length, a plurality of photoconductors supported on one side of said support member and spaced apart along a substantial length thereof, a transparent conductive coating disposed on the other side of said support member, a layer of electroluminescent material on said coating, a plurality of electrodes spaced apart on said material and each arranged over an elemental area of said material, each of said photoconductors being arranged to receive light from a different one of said areas, one side of each of said photoconductors except the last being electrically connected to the electrode of the next adjacent unit, and means electrically connecting the other sides of said photoconductors together.

5. An electroluminescent device comprising a transparent insulating support member, a plurality of pairs of spaced apart electrodes on one surface of said support member, photoconductive material filling the gaps formed by each of said pairs of said electrodes, a transparent conductive coating disposed on the other side of said support member, a layer of electroluminescent material on said coating, a plurality of conductors spaced apart on said material and each in registry with one of said gaps, and one of said electrodes in each of said pairs being electrically connected together, and the other of said electrodes in each of said pairs being electrically connected to one of said conductors registering with a different one of said gaps.

6. An electroluminescent device comprising a plurality of elemental units each including an electroluminescent element and a photoconductive element in light exchange relationship, means electrically connecting said elements including switching means for electrically connecting the photoconductive element in one unit either to the electroluminescent element in the same unit or to the electroluminescent element in an adjacent unit, and means connecting all of said units in parallel with each other for applying a voltage thereacross.

7. An electroluminescent device as in claim 6 wherein said switching means includes at least one photoconductor.

8. A device comprising a plurality of units each including an electroluminescent element and a photoconductive element in light feedback relationship, said elements of each unit being electrically connected in series by means including a first switching photoconductor, each pair of adjacent units being electrically connected by a second switching photoconductor, said second switching photoconductor being connected between the junction of the photoconductive element and the first switching photoconductor of one unit and the junction of the first switching photoconductor and the electroluminescent element in an adjacent unit.

9. An electroluminescent device comprising a transparent insulating support member, a transparent conductive coating on a part of one surface of said support member, a layer of electroluminescent material on said coating, a plurality of conductors each disposed on a different elemental area of said material, an opaque layer on another part of said support member, a plurality of photoconductors on the opposite surface of said support member and each in registry with one of said elemental areas, a photoconductor in registry with an elemental area of said material covered by a conductor forming a unit, a first plurality of switching photoconductors on said opaque layer and each in electrical series between a photoconductor and a conductor within a unit, a second plurality of switching photoconductors on said opaque layer and each connected between the junction of a photoconductor and the switching photoconductor in one unit and the junction between the switching photoconductor and the conductor in an adjacent unit.

10. An electroluminescent device comprising a transparent insulating planar support of extended length, a row of mutually spaced electroluminescent cells on one side of said support, a row of mutually spaced photoconductive cells on the opposite side of said support with each photoconductive cell in light exchange relation with a corresponding one of said electroluminescent cells forming a unit, means connecting a terminal of the photoconductive cell in each unit with a terminal of the electroluminescent cell in an adjacent unit, means connecting all of the other terminals of said electroluminescent cells together, and means connecting all of the other terminals of said photoconductive cells together.

References Cited in the file of this patent

UNITED STATES PATENTS

| | | |
|---|---|---|
| 2,500,929 | Chilowsky | Mar. 21, 1950 |
| 2,558,019 | Toulon | June 26, 1951 |
| 2,608,674 | Depp | Aug. 26, 1952 |
| 2,768,310 | Kazan | Oct. 23, 1956 |